US010435177B2

(12) United States Patent
Ungerleider et al.

(10) Patent No.: US 10,435,177 B2
(45) Date of Patent: Oct. 8, 2019

(54) FOAMED GLASS COMPOSITE ARRESTOR BEDS HAVING PREDETERMINED FAILURE MODES

(71) Applicants: Andrew Ungerleider, Santa Fe, NM (US); W. Gene Ramsey, Richland, WA (US)

(72) Inventors: Andrew Ungerleider, Santa Fe, NM (US); W. Gene Ramsey, Richland, WA (US)

(73) Assignee: Earthstone International LLC, Santa Fe, NM (US)

( * ) Notice: Subject to any disclaimer, the term of this patent is extended or adjusted under 35 U.S.C. 154(b) by 0 days.

(21) Appl. No.: 15/244,115

(22) Filed: Aug. 23, 2016

(65) Prior Publication Data

US 2016/0355277 A1 Dec. 8, 2016

Related U.S. Application Data

(63) Continuation-in-part of application No. 14/966,487, filed on Dec. 11, 2015, now Pat. No. 9,637,246.
(Continued)

(51) Int. Cl.
*B64F 1/02* (2006.01)
*E01F 13/12* (2006.01)
(Continued)

(52) U.S. Cl.
CPC .............. *B64F 1/025* (2013.01); *C03B 19/08* (2013.01); *C03C 3/087* (2013.01); *C03C 11/007* (2013.01);
(Continued)

(58) Field of Classification Search
CPC ........... E01C 3/003; E01C 9/007; B64F 1/025
(Continued)

(56) References Cited

U.S. PATENT DOCUMENTS

| 1,746,860 A | 2/1930 | Lloyd |
| 2,237,032 A | 4/1941 | Haux |

(Continued)

FOREIGN PATENT DOCUMENTS

| CN | 1285335 | 8/2006 |
| CN | 1285335 A | 8/2006 |

(Continued)

OTHER PUBLICATIONS

"Production of Lightweight Aggregates and its Properties", William Andrew Publishing, 2002, pp. 21-22.
(Continued)

*Primary Examiner* — Gary S Hartmann
(74) *Attorney, Agent, or Firm* — C. John Brannon; Brannon Sowers & Cracraft PC (57) ABSTRACT

An arrestor bed for slowing an oncoming aircraft, including an elongated excavation, a plurality of foamed glass aggregate bodies positioned within the elongated excavation, and a covering positioned over the elongated excavation to define an arrestor bed. The respective foamed glass aggregate bodies are oblong, irregularly shaped bodies and have characteristic stacking angles of about 35 degrees. The arrestor bed has a rapid brittle crushing failure mode under compression.

6 Claims, 9 Drawing Sheets

Related U.S. Application Data which is a continuation-in-part of application No. 14/301,988, filed on Jun. 11, 2014, now Pat. No. 9,382,671, which is a continuation-in-part of application No. 11/276,193, filed on Feb. 17, 2006, now Pat. No. 9,376,344.

(51) Int. Cl.

| | | |
|---|---|---|
| E01C 9/00 | (2006.01) | |
| E01C 3/00 | (2006.01) | |
| C03C 3/087 | (2006.01) | |
| C04B 28/04 | (2006.01) | |
| C03C 11/00 | (2006.01) | |
| C04B 14/24 | (2006.01) | |
| C04B 38/08 | (2006.01) | |
| E01C 7/14 | (2006.01) | |
| C03B 19/08 | (2006.01) | |
| C04B 111/00 | (2006.01) | |

(52) U.S. Cl.
CPC ............ *C04B 14/24* (2013.01); *C04B 28/04* (2013.01); *C04B 38/08* (2013.01); *E01C 3/003* (2013.01); *E01C 7/142* (2013.01); *E01C 9/007* (2013.01); *E01F 13/126* (2013.01); *C04B 2111/0075* (2013.01); *C04B 2111/00612* (2013.01)

(58) Field of Classification Search
USPC .................................. 244/114 R; 404/10, 71
See application file for complete search history.

(56) References Cited

U.S. PATENT DOCUMENTS

| | | |
|---|---|---|
| 2,484,911 A | 10/1949 | Merritt |
| 2,514,324 A | 7/1950 | Ford |
| 2,620,597 A | 12/1952 | Ford |
| 2,955,049 A | 10/1960 | Booth |
| 2,977,721 A | 4/1961 | Gronow et al. |
| 3,054,139 A | 9/1962 | Bartholomew et al. |
| 3,056,184 A | 10/1962 | Blaha |
| 3,109,727 A | 11/1963 | Young et al. |
| 3,174,870 A | 3/1965 | Connelly et al. |
| 3,321,414 A | 5/1967 | Otto |
| 3,325,341 A | 6/1967 | Shannon |
| 3,348,933 A | 10/1967 | Schulz |
| 3,432,580 A | 3/1969 | Heidrich et al. |
| 3,443,920 A | 5/1969 | Overcashier |
| 3,459,565 A | 8/1969 | Jones et al. |
| 3,505,089 A | 4/1970 | Rostoker |
| 3,527,587 A | 9/1970 | Velev et al. |
| 3,532,480 A | 10/1970 | D'Eustachio |
| 3,574,583 A | 4/1971 | Goldsmith |
| 3,585,014 A | 6/1971 | Malesak |
| 3,607,170 A | 9/1971 | Malesak |
| 3,855,014 A | 12/1974 | De Vries et al. |
| 3,870,496 A | 3/1975 | Cutler |
| 3,874,861 A | 4/1975 | Kurz |
| 3,945,816 A | 3/1976 | Johnson |
| 3,963,503 A | 6/1976 | Mackenzie |
| 3,967,704 A | 7/1976 | Ogden |
| 3,972,667 A | 8/1976 | Han |
| 3,981,602 A | 9/1976 | Ogden |
| 4,038,063 A | 7/1977 | Williams et al. |
| 4,043,719 A | 8/1977 | Jones |
| 4,049,439 A | 9/1977 | Nakamura et al. |
| 4,050,873 A | 9/1977 | Brunlik et al. |
| 4,059,423 A | 11/1977 | De Vos et al. |
| 4,081,259 A | 3/1978 | Bassin et al. |
| 4,086,015 A | 4/1978 | Eliasson |
| 4,086,098 A | 4/1978 | Le Ruyet et al. |
| 4,110,098 A | 8/1978 | Mattmuller |
| 4,124,365 A | 11/1978 | Williams et al. |
| 4,143,202 A | 3/1979 | Tseng et al. |
| 4,190,416 A | 2/1980 | North |
| 4,198,224 A | 4/1980 | Kirkpatrick |
| 4,212,635 A | 7/1980 | North |
| 4,274,825 A | 6/1981 | North |
| 4,289,521 A | 9/1981 | Scymura |
| 4,441,905 A | 4/1984 | Malmendier et al. |
| 4,797,319 A | 1/1989 | Yoshida et al. |
| 4,826,788 A | 5/1989 | Dennerl et al. |
| 4,871,395 A | 10/1989 | Sugama |
| 4,933,306 A | 6/1990 | Pietsch |
| 4,981,820 A | 1/1991 | Redlund et al. |
| 4,992,321 A | 2/1991 | Kandachi et al. |
| 5,193,764 A | 3/1993 | Larratt |
| 5,326,382 A | 7/1994 | Oat |
| 5,393,342 A | 2/1995 | Hooykaas |
| 5,516,351 A | 5/1996 | Solomon et al. |
| 5,605,570 A | 2/1997 | Bean et al. |
| 5,711,801 A | 1/1998 | Chatterji et al. |
| 5,716,910 A | 2/1998 | Totten et al. |
| 5,821,184 A | 10/1998 | Haines et al. |
| 5,885,025 A | 3/1999 | Angley |
| 5,902,068 A | 5/1999 | Angley |
| 5,928,773 A | 7/1999 | Andersen |
| 5,972,817 A | 10/1999 | Haines et al. |
| 5,983,671 A | 11/1999 | Haines et al. |
| 6,616,752 B1 | 9/2003 | Basura et al. |
| 6,616,866 B1 | 9/2003 | Crompton |
| 6,616,873 B1 | 9/2003 | Duraiswami et al. |
| 6,685,387 B2 | 2/2004 | Allen |
| 6,726,400 B1 | 4/2004 | Angley |
| 6,776,237 B2 | 8/2004 | Dao et al. |
| 6,971,817 B2 | 12/2005 | Allen |
| 7,261,490 B2 | 8/2007 | Allen |
| 7,597,502 B2 | 10/2009 | Allen |
| 7,744,303 B2 | 6/2010 | Rastegar |
| 7,837,409 B2 | 11/2010 | Mahal et al. |
| 7,901,154 B2 | 3/2011 | Carr |
| 7,905,678 B2 | 3/2011 | Rastegar |
| 8,002,495 B2 | 8/2011 | Rastegar |
| 8,021,074 B2 | 9/2011 | Valentini |
| 8,021,075 B2 | 9/2011 | Valentini |
| 8,171,751 B1 | 5/2012 | Ungerleider |
| 8,579,542 B2 | 11/2013 | Narmo |
| 8,740,141 B2 | 6/2014 | Prevost |
| 9,376,344 B2* | 6/2016 | Ramsey .................. C04B 14/24 |
| 9,382,671 B2* | 7/2016 | Ungerleider ............ C04B 28/04 |
| 9,573,700 B2 | 2/2017 | Galbus |
| 9,637,246 B2* | 5/2017 | Ungerleider ............ C04B 30/00 |
| 9,802,717 B2* | 10/2017 | Valentini ................. E01C 9/007 |
| 2003/0097857 A1 | 5/2003 | Oei |
| 2007/0194476 A1 | 8/2007 | Ramsey |
| 2009/0166469 A1 | 7/2009 | Prevost et al. |
| 2010/0028078 A1 | 2/2010 | Carr et al. |
| 2012/0057931 A1 | 3/2012 | Narmo |
| 2013/0020437 A1 | 1/2013 | Valencia |
| 2013/0344337 A1 | 12/2013 | Qi et al. |
| 2014/0294501 A1 | 10/2014 | Ungerleider |
| 2015/0247298 A1 | 9/2015 | Li |
| 2015/0251773 A1 | 9/2015 | Doherty |
| 2016/0176544 A1 | 6/2016 | Valentini |
| 2016/0340838 A1* | 11/2016 | Doherty .................. E01C 9/007 |
| 2016/0355277 A1 | 12/2016 | Ungerleider |
| 2017/0121035 A1 | 5/2017 | Ungerleider |
| 2017/0297739 A1* | 10/2017 | Valentini ................. E01C 9/007 |
| 2017/0356137 A1 | 12/2017 | Webber |

FOREIGN PATENT DOCUMENTS

| | | |
|---|---|---|
| JP | 09110549 | 4/1997 |
| JP | 09110549 A | 4/1997 |
| JP | 09124378 | 5/1997 |
| JP | 09124378 A | 5/1997 |
| JP | 2004238214 | 8/2004 |
| JP | 2004238214 A | 8/2004 |
| RU | 2145315 | 2/2000 |
| RU | 2145315 C1 | 2/2000 |
| RU | 2149853 | 5/2000 |
| RU | 2149853 C1 | 5/2000 |

(56) References Cited

FOREIGN PATENT DOCUMENTS

| | | |
|---|---|---|
| RU | 2203252 | 4/2003 |
| RU | 2203252 C1 | 4/2003 |
| WO | 9009355 | 8/1990 |
| WO | 9009355 A1 | 8/1990 |

OTHER PUBLICATIONS

Chandra et al., "Lightweight Aggregate Concrete", Noyes Publications, 2002, p. 22.

* cited by examiner

FOAMED GLASS COMPOSITE ARRESTOR BEDS HAVING PREDETERMINED FAILURE MODES

CROSS-REFERENCE TO RELATED APPLICATIONS

This patent application is a continuation in part of co-pending U.S. patent application Ser. No. 14/966,487, filed on Dec. 11, 2015, which was a continuation in part of 1 then co-pending U.S. patent application Ser. No. 14/301,988, filed on Jun. 11, 2014, now issued as U.S. Pat. No. 9,382,671, which was a continuation in part of co-pending U.S. patent application Ser. No. 11/276,193 filed on Feb. 17, 2006, now issued as U.S. Pat. No. 9,376,344, and claims priority thereto.

TECHNICAL FIELD

The invention relates generally to the field of ceramic composite materials and, specifically, to an incompressible composite ceramic material having a tailored crushing failure mode and including a lightweight foamed glass or foamed siliceous slag aggregate portion and a cemetitious, concrete, gypsum or other ceramic or structural material matrix portion, and method of using the same to produce aircraft arrestor beds.

BACKGROUND

On rare occasions, aircraft slip out of control and overrun their runways, risking injury to passengers, destruction of adjacent property, and damage to the aircraft itself. Runway overruns can occur during take-offs or landings, with the aircraft leaving the runway at speeds of 70 knots or more. The Federal Aviation Administration (FAA) generally requires a runway safety area (RSA) of 1000 feet extending beyond the end of the runway. While RSA's have become an FAA standard, there remain many runways that were constructed prior to the adoption of the 1000 foot RSA standard. Many airports are located such that runways end adjacent to populated neighborhoods, roads and highways, water, or the like that cannot simply be moved to allow the construction of RSA's in compliance with the 1000 foot overrun requirement.

Shorter arrestor beds with tailored failure mode properties have become the common solution when longer RSA's are not possible. Several materials, including existing soil surfaces beyond the runway have limited abilities to decelerate aircraft. Soil surfaces, while cheap, are very unpredictable in their arresting capability because their properties are quite variable, arising both from soil type and ambient weather and climate conditions. Very dry clay can be hard, slick and nearly impenetrable, while wet mud can cause aircraft to bog down too quickly and damage the landing gear during slowdown. Porous cement offers some advantages, but is still tougher than optimal for slowing aircraft. Other proposed materials are compressible or have a compressible failure mode, which is largely undesirable for arrestor bed use.

Thus, there remains a need for an easily produced arrestor bed material that is heat and chemically resistant and fails with a predictable and predetermined crushing mode to controlledly slow down oncoming aircraft. The present invention addresses this need.

SUMMARY

The technology discussed below relates to manufactured composite materials, such as roadbed and airport runway safety areas (RSA's) incorporating lightweight foamed glass and cementitious or other ceramic materials to define structural composite materials having controlled failure mode properties, and the method for making the same. One object of the present invention is to provide an improved foamed glass-containing structural composite arrestor bed material. Related objects and advantages of the present invention will be apparent from the following description.

DETAILED DESCRIPTION OF THE PREFERRED EMBODIMENTS

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the claimed technology as illustrated therein being contemplated as would normally occur to one skilled in the art to which the claimed technology relates.

Foamed glass is an established lightweight ceramic material. Typically, foamed glass is made in one of two ways. The first way involves preparing a stable foam from water and foaming agent, preparing a wet mixture or slurry of solid components (where cement is the main substance), quick mixing the foam and the slurry, filling molds with prepared the mixed foam/slurry, and firing the same. The second way to make foamed glass involves making use of the property of some materials to evolve a gas when heated. A foamed glass material may be prepared by mixing crushed vitreous particles and a foaming agent (such as $CaCO_3$ or $CaSO_4$), placing the mixture in a mold, heating the mold (such as by passing the mold through a furnace) to a foaming temperature, and cooling the mold to produce foamed glass bodies.

Slag is a nonmetallic byproduct of metallurgical operations. Slags typically consist of calcium, magnesium, and aluminum silicates in various combinations. Iron and steel slags are byproducts of iron and steel production. For example, an iron blast furnace is typically charged with iron ore, fluxing agents (such as limestone or dolomite) and coke (as fuel and reducing agent). Iron ore is typically a mixture of iron oxides, silica, and alumina. When sufficiently heated, molten slag and iron are produced. Upon separation of the iron, the slag is left over. The slag occurs as a molten liquid melt and is a complex solution of silicates and oxides that solidifies upon cooling.

The physical properties of the slag, such as its density, porosity, mean particle size, particle size distribution, and the like are affected by both its chemical composition and the rate at which it was cooled. The types of slag produced may thus conveniently be classified according to the cooling method used to produce them—air cooled, expanded, and granulated. Each type of slag has different properties and, thus, different applications.

While useful as insulation and as abrasive materials, foamed glass bodies (made with or without foamed slag), are typically unsuitable for use as lightweight filler and/or in composite materials due to factors including cost and the propensity for foamed glass to hydrate and expand.

Vitreous materials, such as soda-lime-silica glasses and metallurgical byproduct slags, are typically foamed through a gasification processes to yield a typically predominately vitreous, typically silaceous resultant cellular product. Typically, a foaming precursor is predominately vitreous or non-crystalline prior to the foaming process, since a glassy precursor slag material typically has a viscosity at temperature that is convenient to the foaming process. More typically, the vitreous starting material will have a traditional soda-lime-silica glass composition, but other compositions, such as aluminosilicate glasses, borosilicate glasses, vitreous peralkaline slag or other vitreous slag compositions may be foamed as well. For example, a peraluminous slag with significant alkali and alkaline earth oxides may also be utilized. After the vitreous precursor is foamed, the foamed glass is physically combined with cement to form a composite material suitable for building or structural applications or the like.

In the case of slagaceous precursor materials, the slag is typically predominately vitreous in character, and more typically has a maximum 40% by volume crystalline material. The slag is typically initially crushed and sized to approximately 10 microns median particle size, more typically at least 90 percent of all particles are less than 75 microns.

If the crushed and/or powdered slag is dry, water is added to the powdered slag to about 0.1 to about 0.5% (by mass). Alternately, if no water is added, limestone or other solid foaming agent may be added (typically about 4 percent or less by mass, more typically about 2 percent or less by mass). The mixture is then formed into pellets (between 0.05 and 1 cubic centimeter), preheated (to no more than within 25° C. of the dilatometric softening point) and then passed through a high temperature zone, such as one generated by a rotary kiln or a flame (contained in a ceramic or refractory metal tube). The residence time in the zone is short, typically about 0.5 to about 10 seconds, and the temperature is high (adiabatic flame temperature in excess of 1300° C.). In the case of a flame, the thermal energy provided to the material by the direct flame enables a change of state reaction in the foaming agent and the resulting gas will force the now viscous matter to foam. The foamed pellets or foamed media are air quenched below the dilatometric softening point of the material, and then allowed to dry by slow cooling.

The foamed media typically have a relative volume expansion in excess of three fold, and more typically the volume expansion is as high as 10 fold or greater. This process results in individual, low-density (specific gravity less than 0.3) foamed media with a median pore size in the range of 0.1 to 2 mm.

Composite materials may be prepared by mixing the foamed slag with Portland cement; at least two types of composite materials may be made according to this technique. A first composite material may be prepared by mixing a thin mixture of cement with foamed media, wherein the foamed media comprises at least 85 volume percent of the total cement/other aggregate. The foamed media are typically incorporated into the cement (and aggregates, if needed) after the water has been added. The resulting mixture acts as a very viscous material and is pressure or gravity formed into a slab (or other coherent shape) or direct cast into a prefabricated form. The shape or form is then allowed to set. The resulting composite material sets up to be a rigid, relatively lightweight (specific gravity<0.75) material with surface properties typical of Portland cements. Chemicals and finishing systems compatible with Portland cement can be used in conjunction with this material.

A second composite material is formed as a mixture of cement with typically less than 50 volume percent foamed slag media. The media is typically dry mixed with cement prior to water additions. The mixture is then prepared as common cement. Additional aggregates may be incorporated as per common practice. This second composite material has a very high strength; the composite compressive strength is typically at least 25% higher per unit mass than is that of the identical cement prepared without the foamed slag addition. It can be used in any application compatible with Portland cement.

A third composite material is formed as aqueous slurry mixture comprised of gypsum with typically less than 50 percent by volume foamed glass or slag. The media are typically added to the gypsum after the material is slurried. Additional binders, fillers and setting agents may be added per common practice. The resulting material has a very low density and high acoustic absorption. There are no chemical compatibility limitations on the extent of foamed glass additions. Any limitations typically arise from strength considerations and other physical properties.

Figure 1:
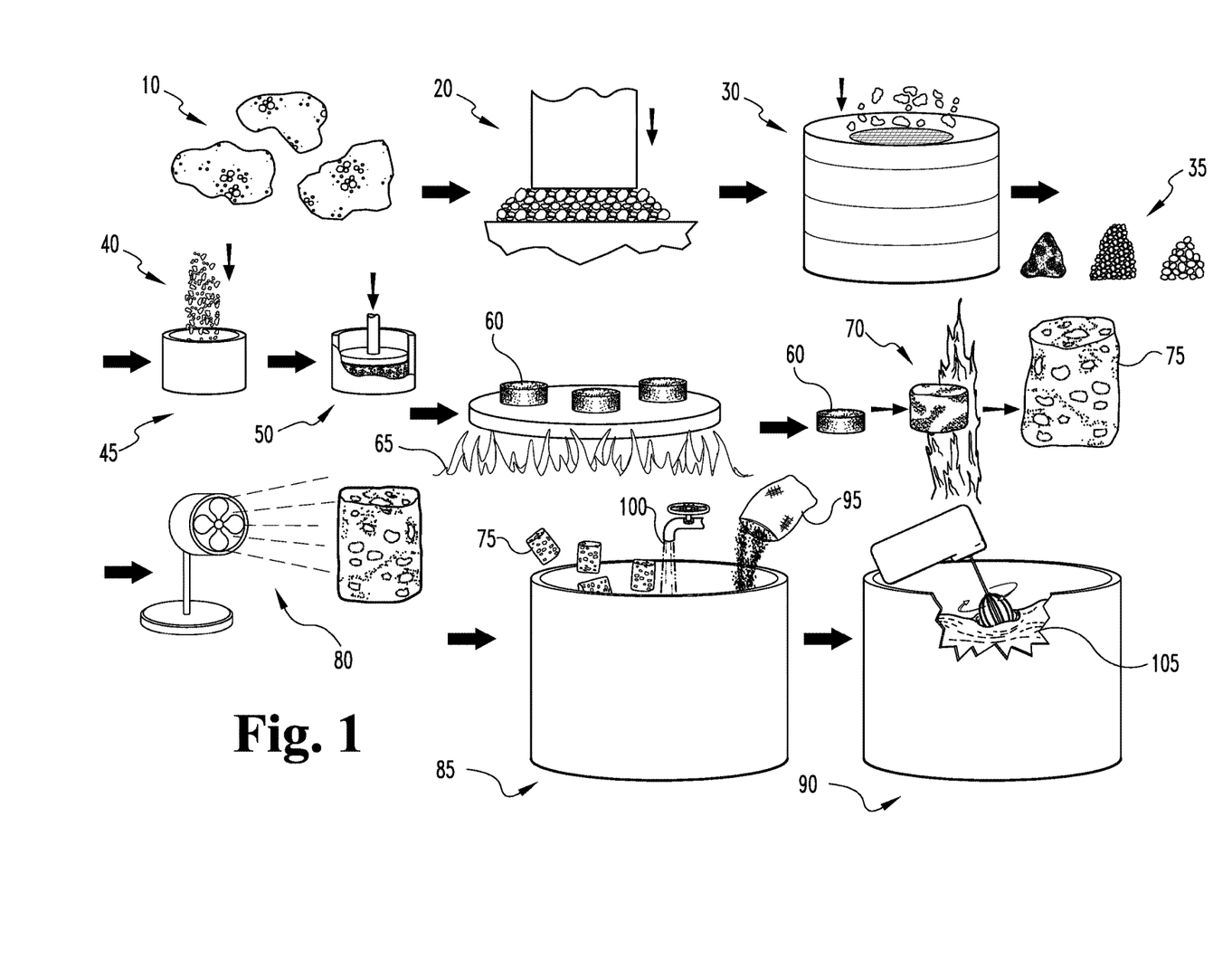
FIG. 1 is a schematic view of a first embodiment of a process for making foamed glass composites.
Figure 2A:
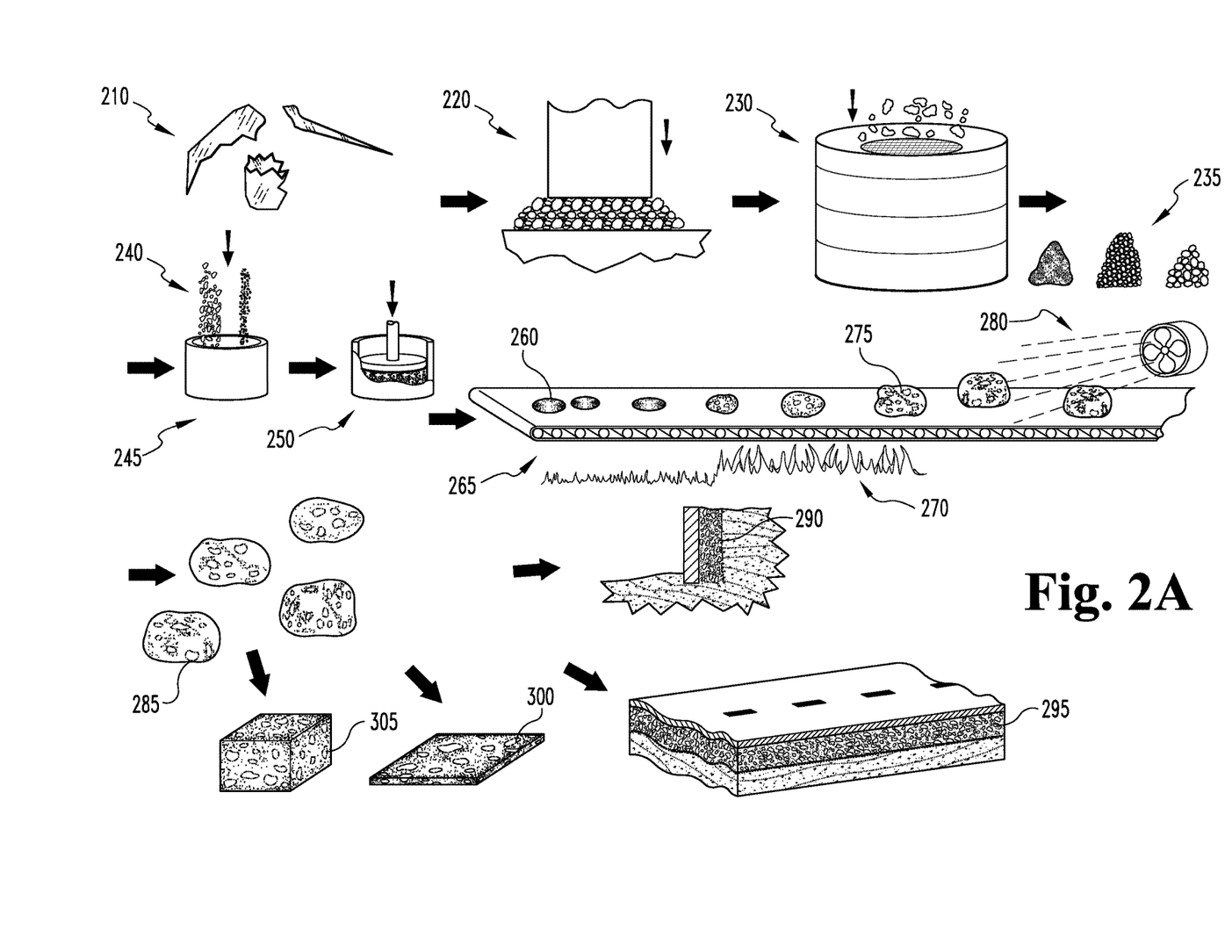
FIG. 2A is a schematic view of a second embodiment of a process for making foamed glass bodies and composites and its uses.

In another example, the vitreous precursors 210 to the foaming process are waste glasses. Waste glasses typically have a soda-lime-silica composition, and are generally first crushed or ground 220, and then typically sized 230, to produce a particulate frit 235 suitable for pelletizing 250 or otherwise forming into regular shapes for foaming.

As with slagaceous precursors as described above, if the particulate waste glass 210 is dry, water may be added to the in small amounts to promote handling and to better adhere the foaming agent uniformly to the particles for more even distribution. Alternately, if no water is added, limestone or other solid foaming agent 240 may still be added, typically in small amounts (such as less than 2 percent by mass) and mixed to form a substantially heterogeneous foamable vitreous mixture. The mixture 245 is then typically formed 250 into pellets (between 0.05 and 1 cubic centimeter), loaves, or other regular green bodies 260 convenient for foaming and is next preheated 265, typically to no more than within 25° C. of the dilatometric softening point. Preheating 265 readies the green bodies 260 for rapid heating 270 into the foaming temperature region.

The preheated green bodies 260 are then passed through a high temperature zone 275, such as one generated by a rotary kiln or a flame (contained in a ceramic or refractory metal tube). The residence time in the zone is short, typically about 0.5 to about 10 seconds, but may be longer for larger green bodies 260. The temperature is substantially high (adiabatic flame temperature at least about 1200° C. and typically around 1300° C. or higher). The rapid influx of thermal energy provided to the material enables a change of state reaction in the foaming agent 240 and the resulting gas will force the now viscous matter to foam.

The foamed bodies 275 are then rapidly quenched 280 to below the dilatometric softening point of the material, and then allowed to cool to room temperature at a second, typically slower, cooling rate. The cooling rate is typically rapid enough such that the foamed glass 275 does not anneal or only partially anneals, resulting in a harder foamed glass body 285 with built-in stresses that enhance its crushing strength and toughness, and also give rise to a crushing failure mode under compression and torsional forces. The cooling rate typically varies due to belt speed. The high end is typically about 15-25° C. per minute, while the low end is typically about 10-20° C. per minute for the temperature range from the foaming temperature to just below the dilatometric softening point; more typically, cooling from the foaming temperature to below the dilatometric softening pint temperature occurs at a rate of about 20 degrees per minute. The cooling rate typically diminishes as the body 285 approaches the softening point.

After foaming, the bodies 275 leave the kiln and are quenched 280, typically via exposure to air or forced water jacket cooling, and the cooling rate is increased to about 25-40° C. per minute during the rapid quench, more typically at least about 30 degrees per minute. After the rapid quench, the cooling rate is decreased to about 3-10° C. per minute. All cooling rate values are for the center of the foamed glass bodies 285.

For foamed media produced on a belt process, the pellets or green bodies 260 are typically configured such that the resultant foamed glass bodies 275, 285 have irregular oblong or ovoid shapes. More typically, the green bodies 260 are preformed or pressed pellets sized such that the resultant foamed bodies 275, 285 have major axis dimensions of between about 10 mm and 80 mm. Accordingly, these bodies 285 are typically sized and shaped to be engineered drop-in replacements for mined gravel aggregate and have superior water management, compressive strength, incompressible or brittle crushing failure mode, erosion, stackability, chemical stability and toughness properties. Alternately, the foamed bodies 285 may be made to other convenient size and shape specifications, such as in larger orthorhombic parallelepiped or 'brick' shapes, still larger 'cinder block' dimensions, relatively thin plates, and the like.

One advantage of this process is that the furnace residence time of vitreous bodies 275 during the foaming process is reduced a factor of 4-9 over most conventional glass foaming techniques. Moreover, the foamed glass bodies 285 can be produced with mean cell sizes of less than about 0.2 mm in diameter, and with typically individual cells sizes ranging down to about 0.1 mm in diameter or less. Bodies 285 having such small cell sizes are typically of the closed cell type, which gives rise to crushing strengths of well over the typical 100 psi (for comparably dense open cell material) to well over 200 psi. Further, bodies 285 having substantially open cells sized in the less than 0.1-0.2 mm range exhibit enhanced capillary action and accordingly rapidly absorb and efficiently retain water.

The natural break-up of the material under rapid cool down, due to thermally induced stresses, results in a more angular, jagged foamed glass body 285 as opposed to a foamed glass piece shaped by crushing a large body. The physical measure is that the so-produced foamed glass bodies 285 have a range of aspect ratios (largest to smallest diameter) about 50% higher than the 1 to 1.25 ratio average for smaller bodies formed via a crushing process. This gives rise to the 35 degree stacking angle and ensures the material breaks up before slip failure.

In one example, oblong, irregularly shaped foamed bodies 285 produced as described above and having major axial dimensions of about 80 mm are used as fill material 290 behind rock retaining walls. As these fill material bodies are relatively light weight, relatively strong in compression, have a characteristic stacking angle of about 35 degrees and are characterized by an open pore structure, a substantially smaller volume of foamed glass aggregate fill is required as compared to traditional mined gravel. For a 6 foot retaining rock wall, the required foundation thickness is reduced from 54 inches to 24 inches, the required rock is reduced by 7.5 cubic feet per linear foot of wall, and the required concrete is reduced by 2.5 cubic feet per linear foot of wall. The amount of graded fill is reduced from 40 cubic feet per linear foot of wall to 24 cubic feet per linear foot of wall. This reduction is made possible by the high stacking angle (about 35 degrees) of the foamed glass aggregate material 290, the physical manifestation of which is its tendency to fail by a crushing mechanism (rapid brittle failure or shattering of the individual cells) instead of the individual aggregate pieces sliding over themselves. Additionally, the open pore structure of the foamed glass aggregate 285 gives rise to superior drainage and water management properties, reducing or eliminating the need for a separate inlaid drain pipe. In other words, by replacing mined gravel with engineered foamed glass aggregate 290 characterized by a high stacking angle, the amount of fill may be nearly halved and, consequently, the foundation depth and wall thickness may likewise be substantially reduced.

Likewise, the foamed glass aggregate fill may replace traditional mined fill gravel 295 in road beds. Less volume of the foamed glass aggregate fill is required, as it has superior strength, porosity and failure mode characteristics, giving rise to shallower road beds, reduced construction time and expenses, less excavated dirt to be trucked away, reduced energy usage in road construction, simplified road drainage, and the like. Moreover, the roads themselves may be constructed of concrete including foamed glass aggregate made as described above, which likewise has enhanced strength and decreased weight characteristics.

In another embodiment, the foamed glass bodies produced as described above may be incorporated into acoustic ceiling tiles 300. The foamed glass material is chemically stable and inert, non-toxic, lightweight, and its porosity gives rise to sound-dampening. The tiles may be made entirely of shaped foamed glass (in the form of relatively thin panels), or may incorporate foamed glass particles or bodies in a structural matrix, such as a polymer based, fibrous, cementitious, or like matrix material. Of course, the foamed glass bodies 285 may also be used as aggregate 305 in traditional concrete.

Figure 2B:
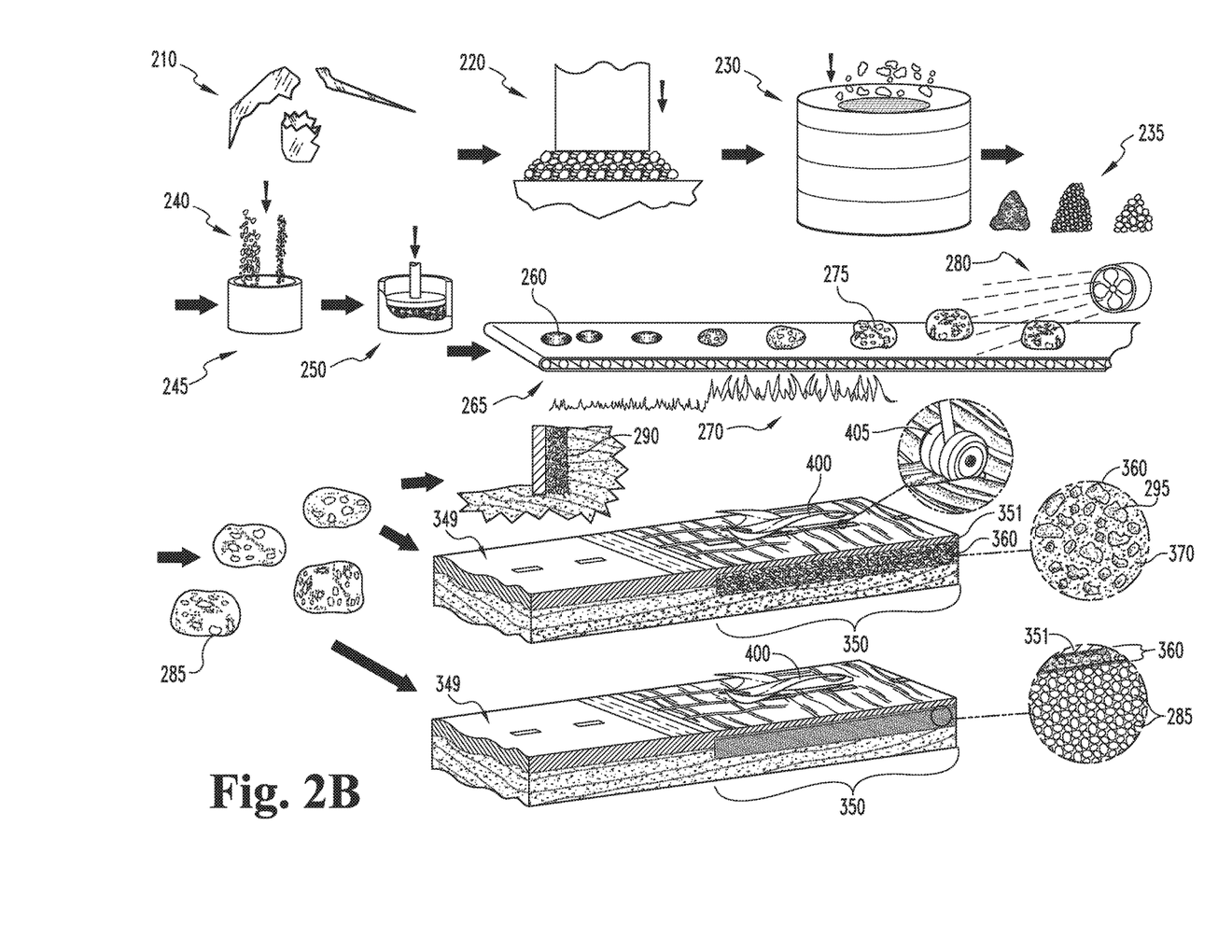
FIG. 2B is a schematic view of a third embodiment of a process for making foamed glass bodies and composites and its uses.

In another embodiment, foamed glass bodies 285 are produced, in some typical embodiments as described above, for incorporation into aircraft or vehicular arrestor beds 350. Typically, the foamed glass bodies 285 are produced having a closed cell or closed porosity structure to prevent water infiltration and hydration. The foamed glass material is chemically stable and inert, inherently non-flammable and does not promote combustion, does not emit any toxic or malodorous fumes, is typically produced with homogeneous and uniform strength and density characteristics, is resistant to deterioration from salt exposure, is UV resistant, resistant to damage from repeated freeze/thaw cycles and/or blowing sand and snow. The arrestor beds 350 are typically formed from a foamed glass composite material 360 including foamed glass bodies 295 either alone, or suspended or enclosed in a (typically ceramic) structural matrix 370. Typically, the composite material 360 includes at least about fifty (50) volume percent foamed glass, more typically at least about sixty (60) volume percent foamed glass, still more typically at least about seventy (70) volume percent foamed glass, yet more typically at least about eighty (80) volume percent foamed glass, and in some embodiments at least about ninety (90) volume percent foamed glass, and in still other embodiments virtually one-hundred (100) volume percent in the bulk of the composite material 360. In some embodiments, the matrix material 370 limited to the top portion of the bed 350 with air filling the gaps between foamed glass aggregate bodies 295 filling the bulk of the bed 350. The foamed glass bodies may be in the form of aggregate 305, shaped foamed glass blocks, or of a combination of sizes and shapes incorporated into a typically rigid, incompressible structural matrix 370, such as a polymer based, fibrous, cementitious, or like matrix material. In some embodiments, the foamed glass bodies 285 may also be used as aggregate 305 in traditional concrete. For arrestor beds 350, a higher relative volume of the foamed glass aggregate 305 and/or bodies 285 fill is required, as the composite arrestor bed 350 typically has lower crush strength to provide the desired predetermined failure mode characteristics, i.e., the arrestor bed 350 will crush under the weight of an oncoming aircraft to bleed off its kinetic energy and slow its progress across the arrestor bed 350 until it stops. Moreover, the arrestor beds 350 are typically constructed of foamed glass bodies 285 and/or aggregate 305 (more typically closed cell foamed glass aggregate 305 and/or bodies 285) in a thin ceramic or structural matrix 370, wherein the surface 375 of the arrestor bed 350 is matrix material 370. The matrix 370 may be concrete, asphalt, or the like. The arrestor bed 350 typically has a solid surface 375, and more typically has a textured or contoured surface 375 to further bleed kinetic energy from an oncoming aircraft. The contoured surface 375 is typically in the form of a series of raised 'speed bumps' that may be crushed through by an oncoming aircraft to further bleed kinetic energy and speed. The composite material 360 may be generally homogeneous in bulk (i.e., the top, relatively thin surface layer may be cementitious, while the rest of the bed body is a homogeneous aggregate 285/cement matrix 370 mixture to define a concrete composite 360), or the composite 360 may have a material concentration gradient therein, such that different portions or regions of the bed 350 have different failure properties, such as crush strength, hardness, toughness, and/or preferred failure directionality.

The foamed glass bodies 285 for the arrestor bed composite material 360 may generally be prepared as described above, albeit the bodies 285 are typically foamed at a higher temperature, typically between about 1500 degrees Fahrenheit and about 1900 degrees Fahrenheit, to yield a closed pore structure. In other embodiments, the foamed glass may be prepared by the techniques described in U.S. Pat. Nos. 5,821,184 and 5,983,671, or the like.

In operation, vehicle arrestor beds 360 may be produced by paving an area immediately beyond the end of a runway, roadway, highway or any paved strip with foamed glass aggregate 285 to define a bed, and covering the bed with a layer 351 of cementitious material to define a composite bed 360. Alternately, the bed 360 may be formed by mixing a plurality of foamed glass aggregate bodies 285 with a structural matrix material 370 and forming the mixture of foamed glass aggregate bodies 285 and structural matrix material 370 into an arrestor bed 360 adjacent the end of a runway. The arrestor bed 360 is typically about two feet thick or deep, although in some embodiments the bed 360 may increase in thickness or depth as it extends away from the runway or may increase in thickness close to its distal edges to ensure halting the aircraft before it overruns the bed 360.

In some embodiments, the cover layer 351 is the same structural material 370, typically cement, more typically Portland cement, combined with the aggregate 285 to define the composite bed 360. In other embodiments, the cover layer 351 may be fabric (such as geotextiles, impact resistant polymers, canvas, or the like), paving materials, or the like.

In operation, and aircraft 400 rollingly or otherwise movingly engages the arrestor bed surface 375 at a relatively high speed, such as 70-100 mph or the like, typically with deployed landing gear 405. The arrestor beds 350 are incompressible and thus fail with a brittle crushing failure mode, with the tires 405 sinking into the arrestor beds 350. Once the tires 405 have sunk at least partially into the arrestor beds 350, the aircraft 400 is slowed by crushing the composite material 360, primarily the foamed glass aggregate 285, both beneath and in front of the oncoming tires 405. The composite material 360 in general, and the foamed glass aggregate specifically, is rigid and brittle and not more than de minimally elastically and/or plastically deformable, and thus depletes aircraft kinetic energy by using said energy to crush the composite and aggregate material 360, 285.

In some embodiments, the foamed glass aggregate 285 and/or arrestor beds 350 formed therefrom exhibit about 0.1 $N/mm^2$ crushing resistance at 20% compression. The aggregate bodies typically have crush strengths between about 50 PSI and 200 PSI, and typically have densities between about 100 $kg/m^3$ and 180 $kg/m^3$, more typically between about 6 pounds per cubic foot and about 14 pounds per cubic foot, still more typically between about 7 pounds per cubic foot and about 12 pounds per cubic foot.

Figure 3A:
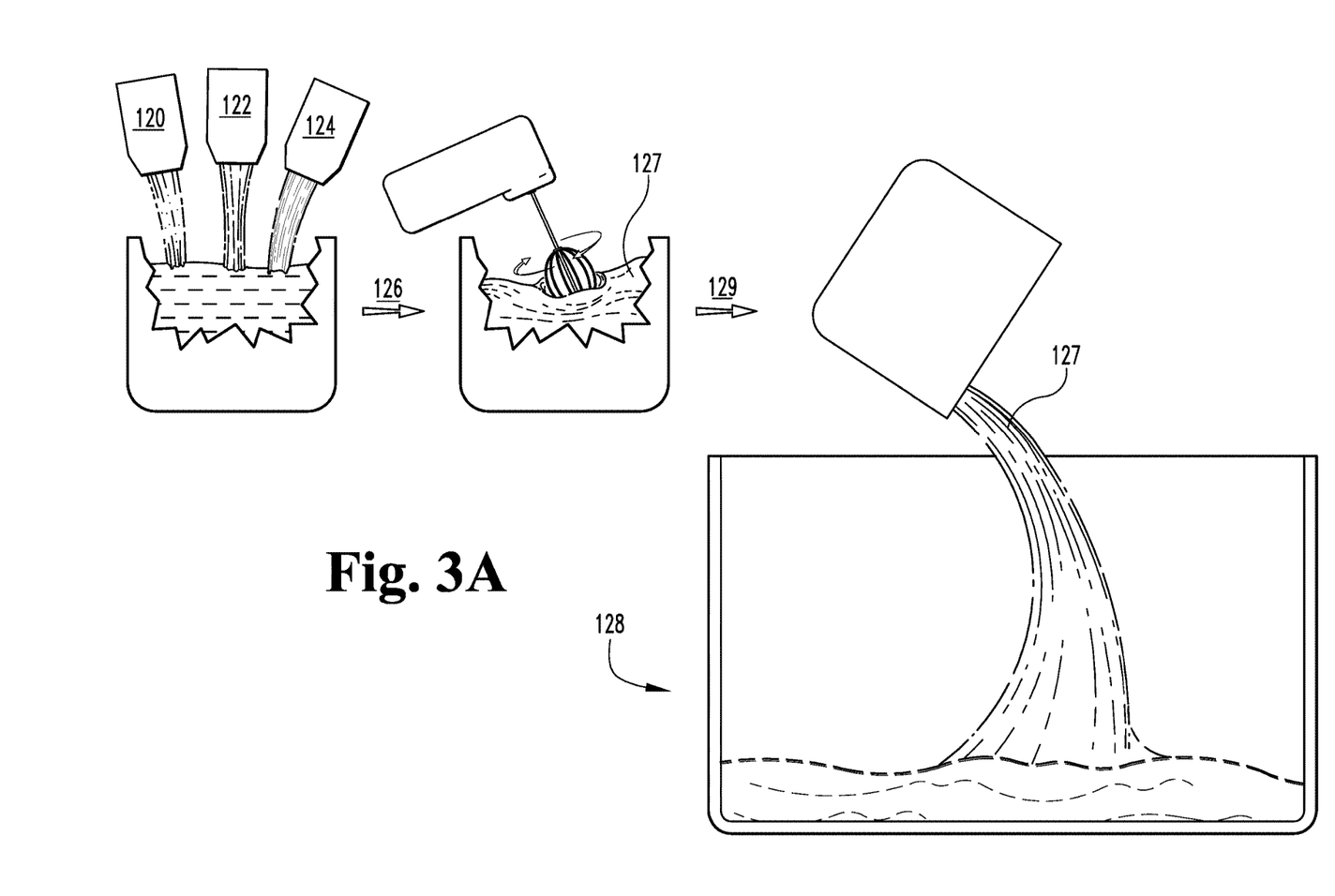
FIG. 3A is a schematic view of a process for mixing a batch of precursors for a foamed glass article according to a fourth embodiment of the present novel technology.
Figure 3B:
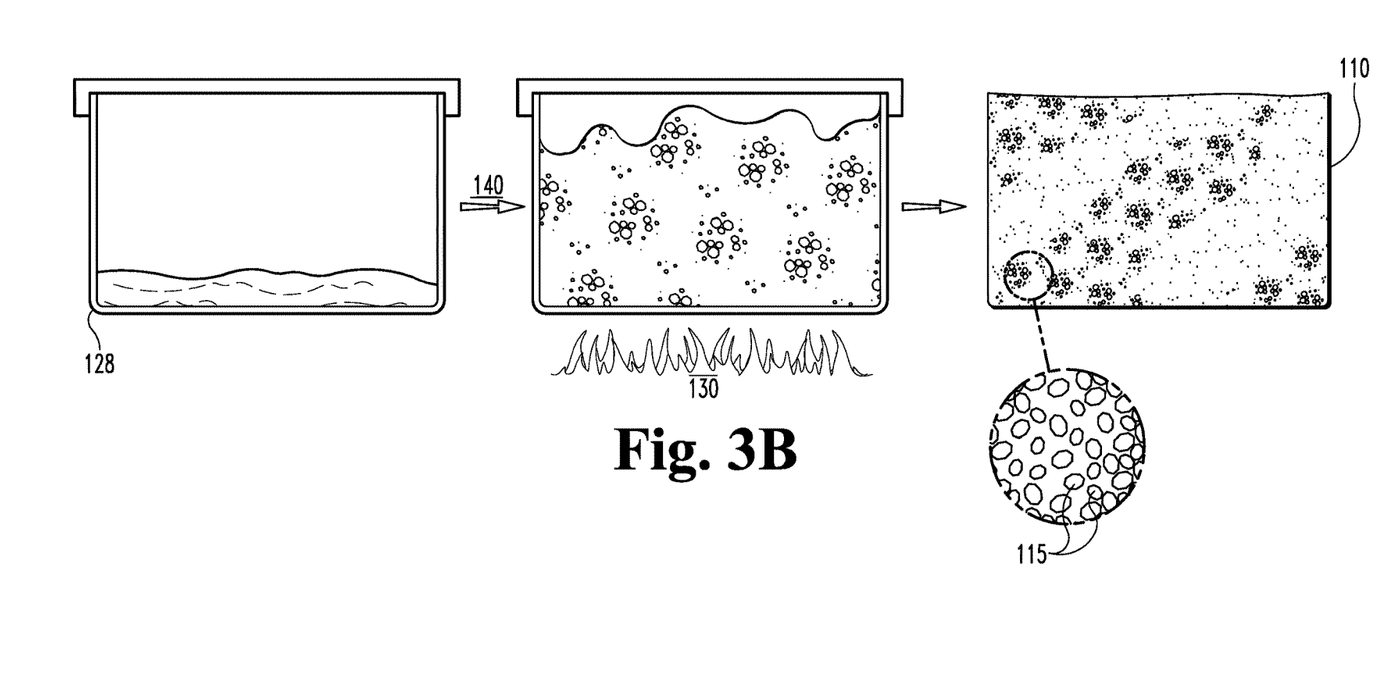
FIG. 3B is a schematic view of a process for firing a foamed glass article mixed according to FIG. 3A.
Figure 3C:
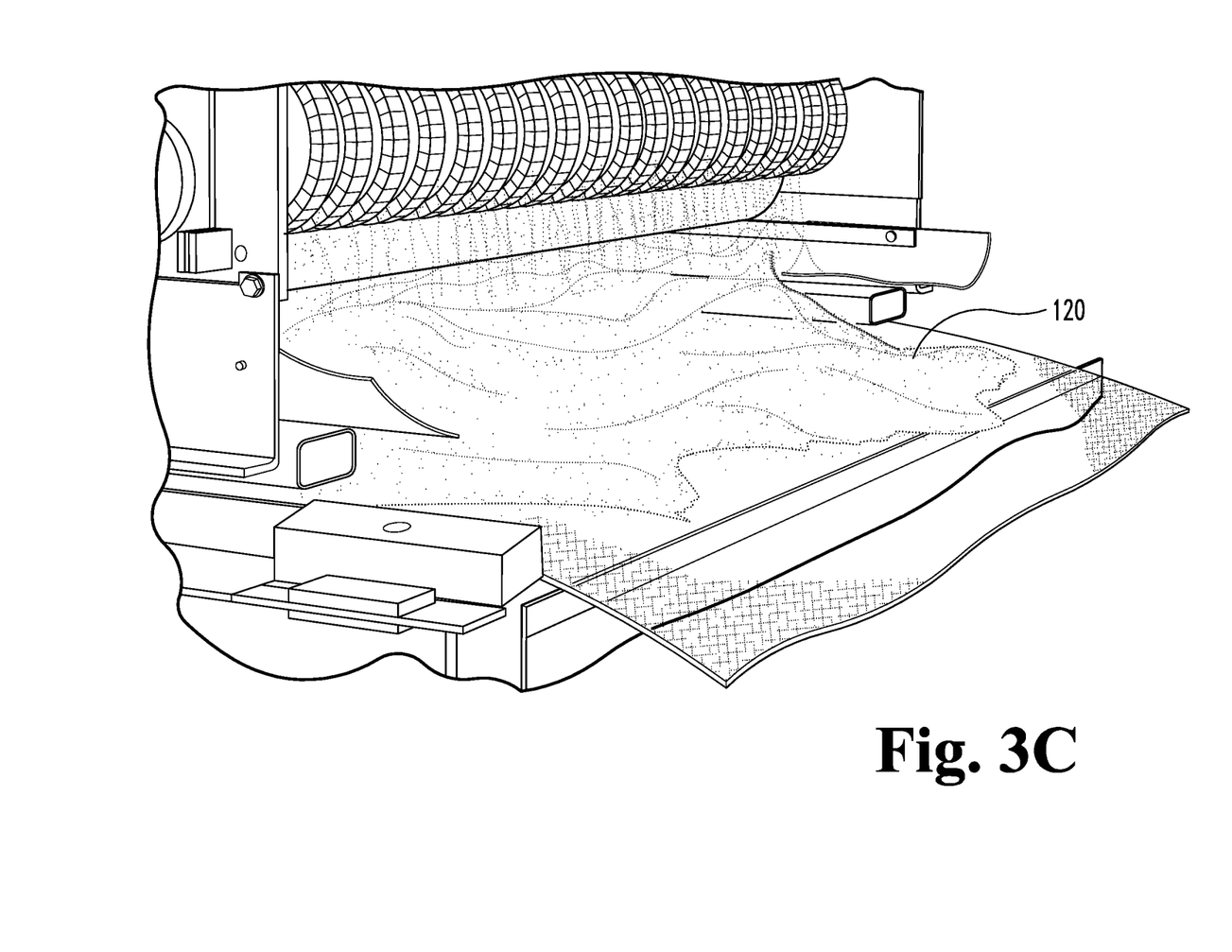
FIG. 3C is a perspective view of as milled glass powder according to the process of FIG. 3B.
Figure 3D:
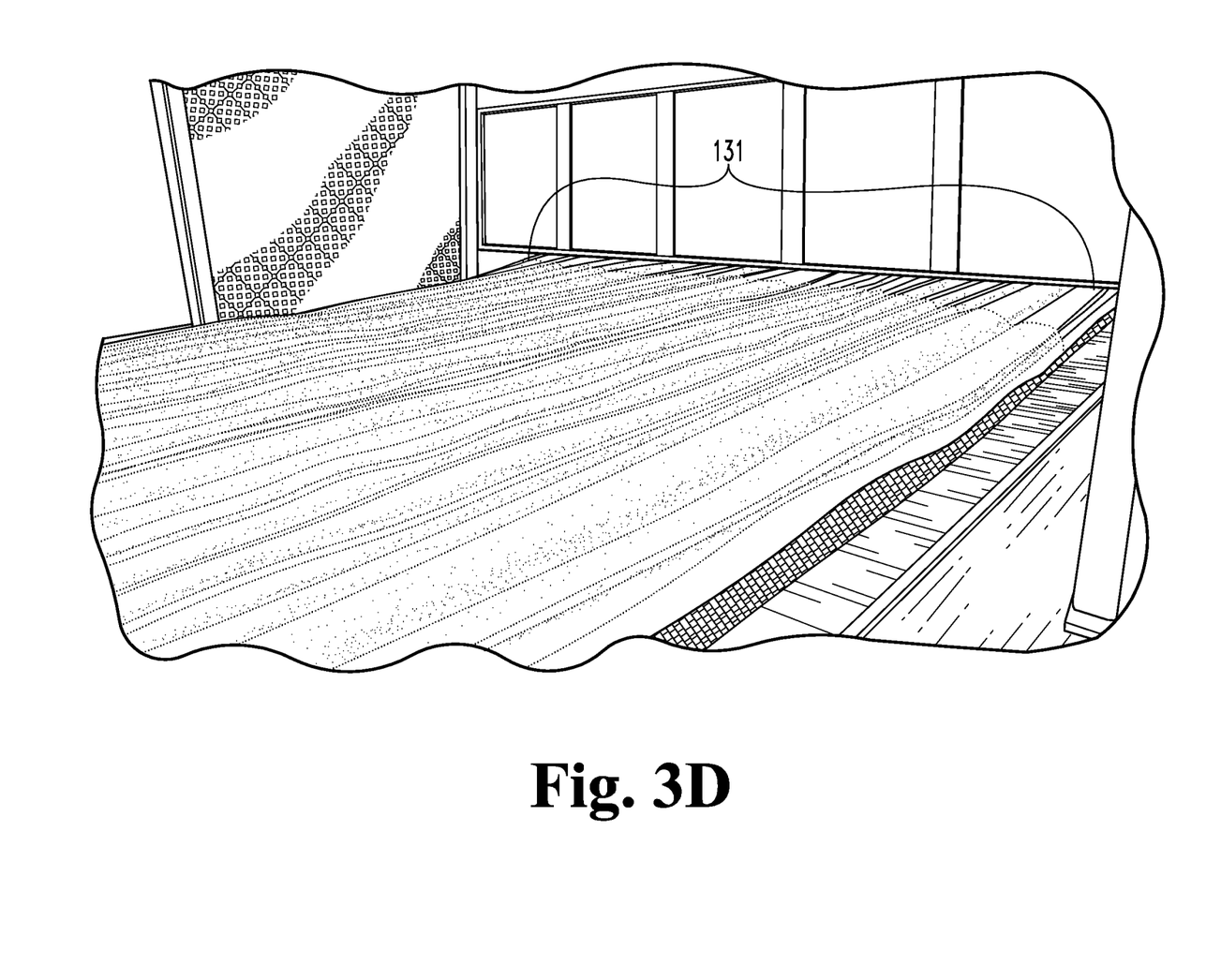
FIG. 3D is a perspective view of rows of milled glass powder mixture ready for firing.
Figure 3E:
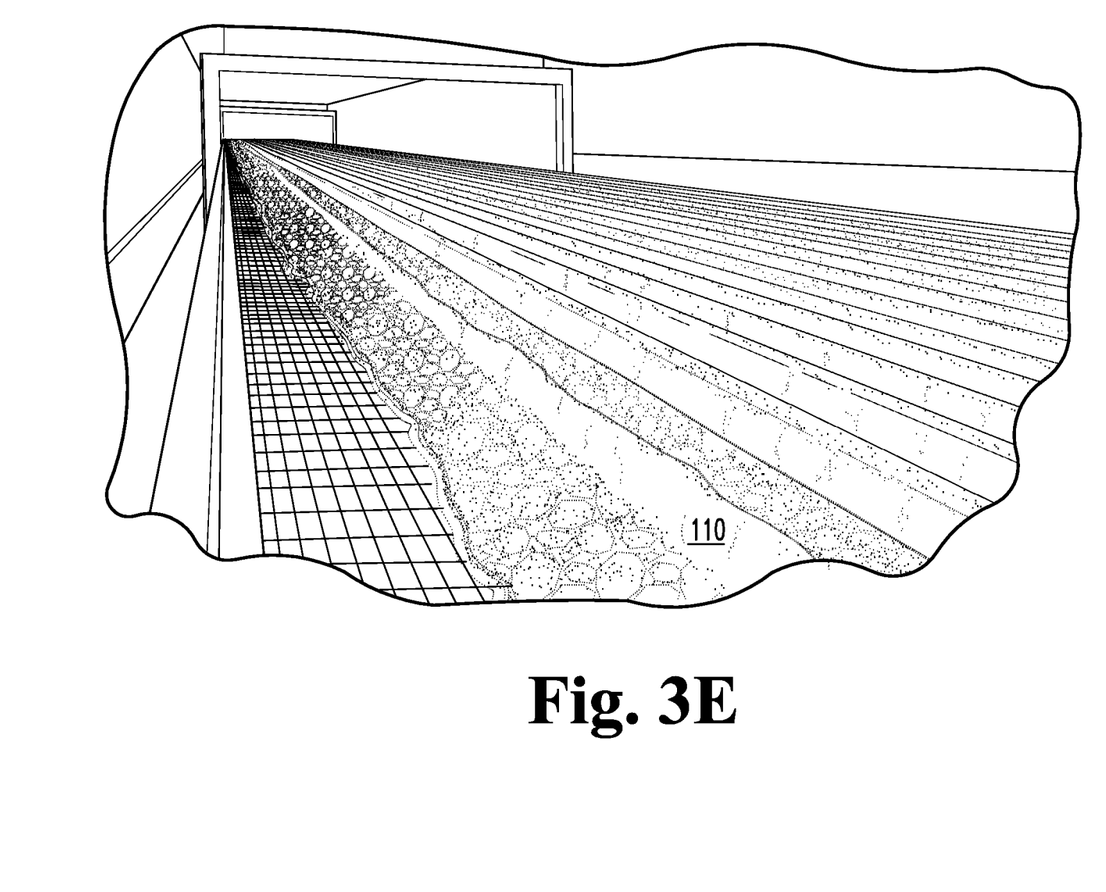
FIG. 3E is a perspective view of FIG. 3D after firing into a substantially continuous foamed glass sheet.
Figure 4:
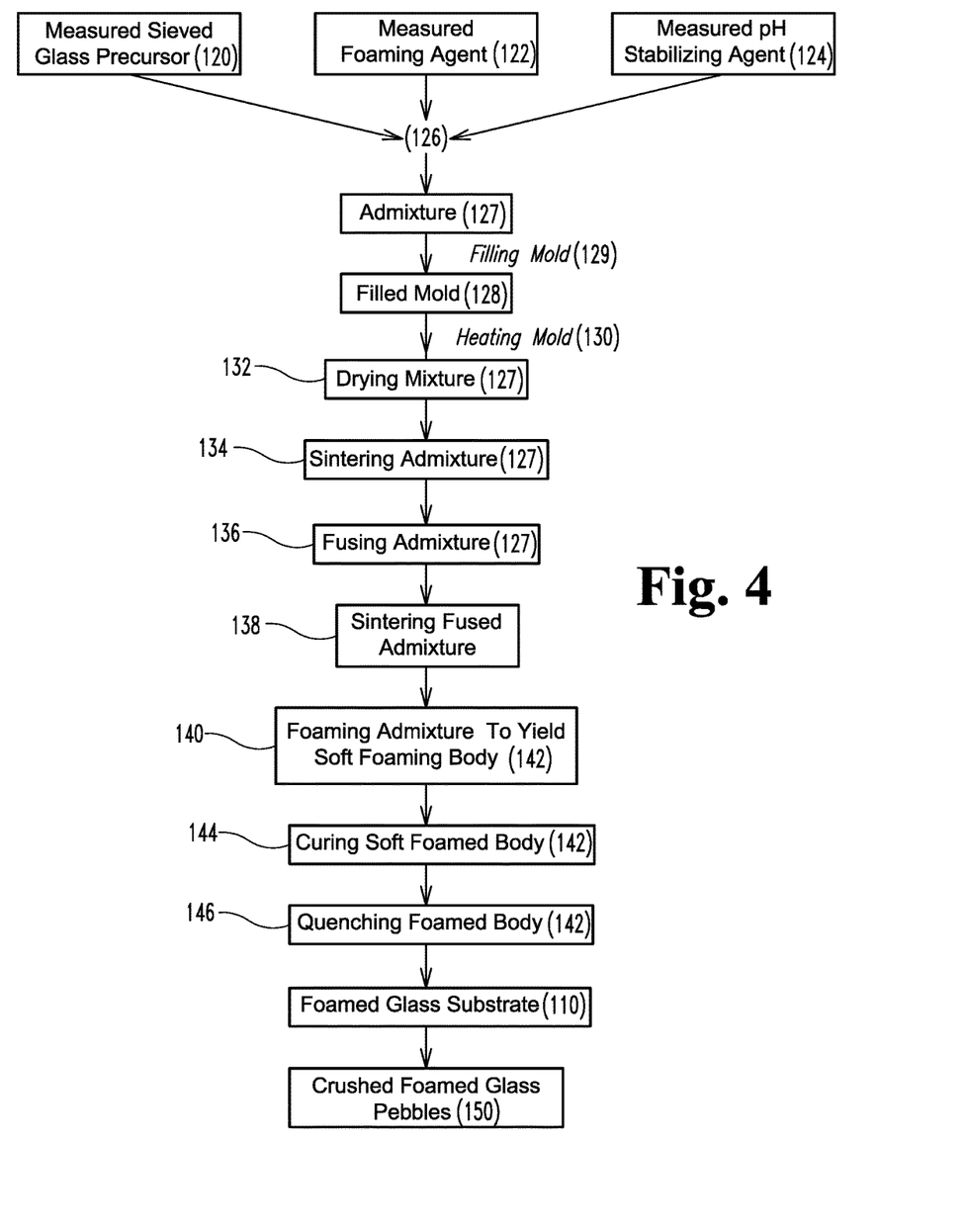
FIG. 4 is a process diagram of the process illustrated in FIGS. 3A and 3B.

FIGS. 3A-4 illustrate another method of producing lightweight foamed glass matrix 110 defining a plurality of voluminous, closed off and/or interconnecting pores 115. The pores 115 typically have diameters ranging from about 0.2 mm to about 2.0 mm. The pore walls 117 can be formed to exhibit a crazed or microcracked microstructure 119. As illustrated schematically in FIGS. 3A-4, a ground, milled and/or powdered glass precursor 120, such as recycled waste bottle and/or window glass, is mixed with a foaming agent 122 (typically a finely ground non-sulfur based gas evolving material, such as calcium carbonate) to define an admixture 127. The foaming agent 122 is typically present in amounts between about 1 weight percent and about 3 weight percent and sized in the average range of about 80 to minus 325 mesh (i.e. any particles smaller than this will pass through—typically, the apertures in 80 mesh are between about 150 and about 200 micrometers across and the apertures in −352 mesh are between about 40 and about 60 micrometers across). More typically, the foaming agent has a particle size between about 5 and about 150 microns. Typically, a pH modifier such as dicalcium phosphate 124 is added to the admixture 27, wherein the pH modifier 124 becomes effective when the foamed glass product 110 is used in an aqueous environment. The pH modifier 124 is typically present in amounts between about 0.5 and 5 weight percent, more typically between about 1 and about 2 weight percent. Additional plant growth nutrient material may be added to the starting mixture to vary or enhance the plant growth characteristic of the final product 110.

Foamed glass, like most ceramics, is naturally hydrophobic. As hydrophobic surfaces are not conducive to wetting and impede capillary action, treatment is typically done to make the pore walls 117 hydrophilic.

In one embodiment, the pore walls 117 are coated to form a plurality of microcracks 119 therein. The microcracks 119 supply increased surface area to support wicking. Alternately, or in addition, an agent may be added to further amend the surface properties to make the foamed glass more hydrophilic. Such an agent may be a large divalent cation contributor, such as ZnO, BaO, SrO, or the like. The hydrophilic agent is typically added in small amounts, typically less than 1.5 weight percent and more typically in amounts of about 0.1 weight percent.

The combination is mixed 126, and the resulting dry mixture 127 may then be placed into a mold 128, pressed into a green body and fired without the use of a mold, or, more typically, arrayed into rows 131 of powder mixture 127 for firing and foaming. Typically, whether placed 129 into the mold 128 or not, the mixture 127 is typically arrayed in the form of several rows 131, such as in mounds or piles of mixture typically having a natural angle of repose of about 15 to 50 degrees, although even greater angles to the horizontal can be achieved by compressing the dry mixture 127. This arraying of the rows 131 allows increased control, equilibration and optimization of the heating of the powder 127 during firing, reducing hot and cold spots in the furnace as the powder 127 is heated. This combing of the powder 127 into typically rows 131 of triangular cross-sections allows heat to be reflected and redirected to keep heating of the rows generally constant.

The mold 128, if used, is typically a refractory material, such as a steel or ceramic, and is more typically made in the shape of a frustum so as to facilitate easy release of the final foamed glass substrate 110. Typically, the inside surfaces of the mold 128 are coated with a soft refractory release agent to further facilitate separation of the foam glass substrate 110 from the mold 128. In a continuous process, the powder 127 is typically supported by a fiberglass mesh fleece or the like to prevent fines from spilling as the powder 127 is moved via conveyor through a tunnel kiln; the fleece is burned away as the powder 127 sinters.

The so-loaded mold 128 is heated 130 in a furnace by either a batch or continuous foaming process. More typically, the mixture 127 is then heated 130 in order to first dry 132, the sinter 134, fuse 136, soften 138, and foam 140 the mixture 127 and thereby produce a foamed glass substrate 110 having a desired density, pore size and hardness. As the powdered mixture 127 is heated to above the softening point of glass (approximately 1050 degrees Fahrenheit) the mixture 127 begins to soften 138, sinter 134, and shrink. The division of the powdered mixture 127 into rows or mounds allows the glass to absorb heat more rapidly and to therefore foam faster by reducing the ability of the foaming glass to insulate itself. At approximately 1025 degrees Fahrenheit, the calcium carbonate, if calcium carbonate has been used as the foaming agent 122, begins to react with some of the silicon dioxide in the glass 120 to produce calcium silicate and evolved carbon dioxide. Carbon dioxide is also evolved by decomposition of any remaining calcium carbonate once the mixture reaches about 1540 degrees Fahrenheit, above which calcium carbonate breaks down into calcium oxide and carbon dioxide gas. Once the temperature of the mixture 127 reaches about 1450 degrees Fahrenheit, the glass mixture 127 will have softened sufficiently for the released carbon dioxide to expand and escape through the softened, viscous glass; this escape of carbon dioxide through the softened glass mass is primarily responsible for the formation of cells and pores therein. The mixture 127 in the mold 128 is held for a period of time at a peak foaming temperature of, for example, between about 1275 and about 1900 degrees Fahrenheit, more typically between about 1550 and about 1800 degrees Fahrenheit, still more typically between about 1650 and about 1850 degrees Fahrenheit, or even higher, depending on the properties that are desired. By adjusting the firing temperatures and times, the density and hardness as well as other properties of the resultant substrate 110 may be closely controlled.

As the mixture 127 reaches foaming temperatures, each mass of foaming 140 glass, originating from one of the discrete rows or mounds, expands until it comes into contact and fuses with its neighbors. The fused mass of foaming glass then expands to conform to the shape of the walls of the mold 128, filling all of the corners. The shapes and sizes of the initial mounds of mixture are determined with the anticipation that the foaming 140 mixture 127 exactly fills the mold 128. After the glass is foamed 140 to the desired density and pore structure, the temperature of the furnace is rapidly reduced to halt foaming 140 of the glass. When the exterior of the foamed glass in the mold has rigidified sufficiently, the resultant body 110 of foamed glass is removed from the mold 128 and is typically then air quenched to thermally shock the glass to produce a crazed microstructure 119. Once cooled, any skin or crust is typically cut off of the foamed glass substrate 110, which may then be cut or otherwise formed into a variety of desired shapes. Pore size can be carefully controlled within the range of about 5 mm to about 0.5 mm, more typically within the range of between about 2.0 mm and 0.2 mm. Substrate density can be controlled from about 0.4 g/cc to about 0.26 g/cc. Typically, the bulk density of the crushed foam may be as low as 50% of the polyhedral density.

The substrate 110 may be either provided as a machined polyhedral shape 110 or, more typically, as a continuous sheet that may be impacted and/or crushed to yield aggregate or pebbles 150 (typically sized to be less than 1 inch in diameter). The crushed substrate material 150 may be used to retain water and increase air volume in given soil combinations. The polyhedrally shaped substrate bodies 110 are typically sized and shaped as aggregate for use in an RSA composite material. The foamed glass material 110 itself is typically resistant to aqueous corrosion and has minimal impact on solution pH. In order to provide better pH control, the foamed glass material 110 is typically doped (in batch stage, prior to foaming) with specific dicalcium phosphate or a like pH stabilizing material 124 which dissolves in water to help stabilize the pH. The foamed glass substrate 110 can typically hold between about 1.5 and about 5 times its own weight in water in the plurality of interconnected pores 117.

Crushed foam bodies 150 may be rapidly made by an alternate method. Using soda-lime glass frit or powder as the glass component 122, the processing is similar to that described above but without the annealing step. The alternate method employs the same foaming temperature ranges as related above. The batch material 127 consists of up to 8 percent by mass limestone, magnesite, or other applicable foaming agent 122, usually less than 2 percent by mass dicalcium phosphate 124, with the balance being a borosilicate, silicate, borate or phosphate glass frit 122. The batch 127 is then placed in a typically shallow mold 128, more typically having a configuration of less than 2" batch for every square yard of mold surface. The mold 128 is typically then heated to approximately 250° C. above the dilatometric softening point for soda-lime glass (or the equivalent viscosity for other glass compositions) and allowed to foam. The mold 128 is held at the foaming temperature for less than 30 minutes and then pan quenched, i.e. substantially no annealing is allowed to occur This method typically yields a material 110 of density less than 0.25 g/cc, and more typically as low as about 0.03 g/cc. This material 110 is then crushed into pebbles 150, with a corresponding lower bulk density as per the above-described method. Material made by this alternate method has similar chemical properties as described above but has substantially lower strength.

Still another alternate method of preparing foamed glass substrate material 110 is as follows. A batch 127 is prepared as discussed above and pressed into small (typically less than 5 mm diameter) pellets. The pellets are rapidly heated, such as by passage through a flame source, passage through a rotary furnace, or the like. Typically, the pellets are heated to about 1500 degrees Fahrenheit, such as to cause the pellet to expand as a foam particulate without the need for a mold. This material yields the weakest, but least dense foam particles. The typical density may be as low as 0.02 g/cc or as high as 0.2 g/cc, or higher.

The foamed glass substrate 110 typically has a porosity in the range of between about sixty-five and about eighty-five percent. Air holding capacity is typically between about forty and about fifty-five percent.

The pore size is typically between about 0.2 mm and about 2.0 mm in diameter, with a relatively tight pore size distribution. The finished substrate 110 is typically processed through a series of conveyors and crushing equipment to yield a desired size spread of pellets 150.

The precursor glass material is typically recycled or post-consumer waste glass, such as plate, window and/or bottle glass. The glass is ground or milled to a fine mesh profile of minus 107 microns. A typical sieve analysis of the precursor glass is given as Table 1, and a compositional analysis of the glass is given as Table 2.

TABLE 1

| Sieve Analysis | | | |
|---|---|---|---|
| Class up to (μm) | Pass (%) | Remainder (%) | Incidence (%) |
| 0.7 | 1.3 | 98.7 | 1.3 |
| 0.9 | 1.6 | 98.4 | 0.3 |
| 1 | 1.8 | 98.2 | 0.2 |
| 1.4 | 2.8 | 97.2 | 1.0 |
| 1.7 | 3.7 | 96.3 | 0.9 |
| 2 | 4.6 | 95.4 | 0.9 |
| 2.6 | 6.4 | 93.6 | 1.8 |
| 3.2 | 7.9 | 92.1 | 1.5 |
| 4 | 9.9 | 90.1 | 2.0 |
| 5 | 12.0 | 88 | 2.1 |
| 6 | 14.0 | 86 | 2.0 |
| 8 | 17.5 | 82.5 | 3.5 |
| 10 | 20.5 | 79.5 | 3.0 |
| 12 | 23.3 | 76.7 | 2.8 |
| 15 | 27.3 | 72.7 | 4.0 |
| 18 | 31.1 | 68.9 | 3.8 |
| 23 | 37.2 | 62.8 | 6.1 |
| 30 | 45.1 | 54.9 | 7.9 |
| 36 | 51.2 | 48.8 | 6.1 |
| 45 | 59.2 | 40.8 | 8.0 |
| 56 | 67.6 | 32.4 | 8.4 |
| 63 | 72.3 | 27.7 | 4.7 |
| 70 | 76.6 | 23.4 | 4.3 |
| 90 | 86.5 | 13.5 | 9.9 |
| 110 | 92.7 | 7.3 | 6.2 |

TABLE 1-continued

| Sieve Analysis | | | |
|---|---|---|---|
| Class up to (μm) | Pass (%) | Remainder (%) | Incidence (%) |
| 135 | 97.1 | 2.9 | 4.4 |
| 165 | 99.3 | 0.7 | 2.2 |
| 210 | 100.0 | 0 | 0.7 |

TABLE 2

| Glass oxide | Wt. % |
|---|---|
| $SiO_2$ | 71.5 |
| $Na_2O$ | 12.6 |
| $K_2O$ | 0.81 |
| $Al_2O_3$ | 2.13 |
| CaO | 10.1 |
| MgO | 2.3 |
| $TiO_2$ | 0.07 |
| $Fe_2O_3$ | 0.34 |
| BaO | 0.01 |
| $SO_3$ | 0.05 |
| ZnO | 0.01 |

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. An aircraft arrestor bed, comprising:
   a shallow excavation formed immediately adjacent the end of a runway; and
   a composite material filling the shallow excavation;
   wherein the shallow excavation is at least about one foot deep;
   wherein the composite material further comprises a plurality of oblong foamed glass aggregate bodies distributed in a structural matrix material;
   wherein the composite material is at least about 50 volume percent oblong foamed glass aggregate bodies;
   wherein the oblong foamed glass bodies have brittle crushing failure modes;
   wherein the foamed glass aggregate bodies each have strengths of at least 50 PSI;
   wherein the aircraft arrestor bed has a crushing failure mode under the compressive and torsional loads; and
   wherein the structural matrix material is Portland cement.

2. The aircraft arrestor bed of claim 1 wherein the composite material is at least about 90 volume percent foamed glass bodies; wherein the oblong foamed glass aggregate bodies have a closed cell structure; wherein the oblong foamed glass aggregate bodies have a crush strength of at between about 50 PSI and 200 PSI, and wherein the oblong foamed glass aggregate bodies have densities of between about 6 lb/ft³ and 14 lb/ft³; and wherein the oblong foamed glass aggregate bodies have compositions in the range around 70 weight percent $SiO_2$, around 13 weight percent $Na_2O$ and around 10 weight percent CaO with the remainder being other metal oxides.

3. The aircraft arrestor bed of claim 1 and further comprising a cover layer positioned atop the composite material.

4. The aircraft arrestor bed of claim 3 wherein the cover layer is structural matrix material.

5. The aircraft arrestor bed of claim 3 wherein the cover layer is fabric.

6. The aircraft arrestor bed of claim 1 wherein the composite material defines a plurality of adjacent prefabricated composite portions.

* * * * *